US005731043A

United States Patent [19]
Horinka et al.

[11] Patent Number: 5,731,043
[45] Date of Patent: *Mar. 24, 1998

[54] TRIBOELECTRIC COATING POWDER AND PROCEES FOR COATING WOOD SUBSTRATES

[75] Inventors: Paul R. Horinka, Reading; Martin J. Korecky, Shillington, both of Pa.

[73] Assignee: Morton International, Inc., Chicago, Ill.

[*] Notice: The term of this patent shall not extend beyond the expiration date of Pat. No. 5,552,191.

[21] Appl. No.: 644,553

[22] Filed: May 10, 1996

Related U.S. Application Data

[63] Continuation-in-part of Ser. No. 169,793, Dec. 20, 1993, Pat. No. 5,552,191, which is a continuation of Ser. No. 837,459, Feb. 14, 1992, abandoned.

[51] Int. Cl.$^6$ .................................................. B05D 1/04
[52] U.S. Cl. .......................... 427/475; 427/476; 427/482; 427/485; 427/486
[58] Field of Search ............................ 427/475, 476, 427/482, 485, 486

[56] References Cited

U.S. PATENT DOCUMENTS

| | | | |
|---|---|---|---|
| 3,822,407 | 7/1974 | Schmitt et al. | 428/402 |
| 3,903,321 | 9/1975 | Schaad | 427/27 |
| 4,027,066 | 5/1977 | Victorius | 428/402 |
| 4,056,653 | 11/1977 | Gebhard et al. | 428/402 |

(List continued on next page.)

FOREIGN PATENT DOCUMENTS 0371528  6/1990  European Pat. Off. .

OTHER PUBLICATIONS

Poly.–Plast. Technol. Eng., 7(2), 1976, pp. 119–124, 133–137, 159–166, 197 and 198 (of 119–220 page article).
Kirk–othmer: *Encyclopedia of Chemical Tech.*, vol. 19, 3rd Ed., 1982, pp. 1–27.
Journal of Electrostatics, 16 (1985), pp. 277–286.

(List continued on next page.)

Primary Examiner—Benjamin Utech
Attorney, Agent, or Firm—Charles N. Lovell; Gerald K. White

[57] ABSTRACT

An electrically chargeable dielectric coating powder and a triboelectric coating process for applying the powder to wood substrates are described. The coating powder is a mass of finely divided, heat fusible dielectric plastic material having an average particle size (Mv) of between 30 and 45 microns and a particle size distribution (all percents defined in weight percent) of:

95%–100% smaller than 88 microns,

5%–15% smaller than 15.56 microns and

0%–6% smaller than 11 microns.

Preferably the coating powder has 0% larger than 88 microns and an Mv=about 30–40, preferably 35–40 microns. More preferably the particle distribution further includes 10%–15% smaller than 15.56 microns and 4%–6% smaller than 11 microns, and an Mv of between about 35 and 36 microns. Most preferably the particle distribution further includes:

about 11.5% smaller than 15.56 microns and about 4.3% smaller than 11 microns, and an Mv of about 35.9. Preferably the powder is a thermosetting resin composition.

6 Claims, 2 Drawing Sheets

U.S. PATENT DOCUMENTS

| | | | |
|---|---|---|---|
| 4,071,192 | 1/1978 | Myers | 239/3 |
| 4,109,027 | 8/1978 | Crase | 427/28 |
| 4,113,681 | 9/1978 | Harmuth | 428/402 |
| 4,154,871 | 5/1979 | White et al. | 427/27 |
| 4,172,776 | 10/1979 | Singlelyn | 428/402 |
| 4,689,241 | 8/1987 | Richart et al. | 427/28 |
| 5,552,191 | 9/1996 | Herinko et al. | 427/475 |

OTHER PUBLICATIONS

R.P. Lebman, article entitled "Optimized Powder Coating of Critical Objects," 1988, 13 pages.

*Paint & Resins,* 59, #5, Oct., 1989, pages 8 and 10.

*SME Technical Paper* (FC89–626) by J. Dailidas, Oct. 1989, 23 pages entitled "Powder Appln. Utilizing Tribe Charging Equipment".

*Product Finishing Magazine,* 54, #4, Jan. 1990, pp. 1–8.

Hosokawa MicroPul Article by K.H. Schwamborn, presented at May 15–16, 1990, seminar, 24 pages.

*Proceedings of the Eighteenth Water–borne, Higher–Solids, and Powder Coatings Symposium,* Feb. 6–8, 1991, pp. 191–211.

5,731,043

TRIBOELECTRIC COATING POWDER AND PROCEES FOR COATING WOOD SUBSTRATES

CROSS-REFERENCES

The present application is a continuation-in-part of our application Ser. No. 08/169,793 filed Dec. 20, 1993 and now U.S. Pat. No. 5,552,191, which is in turn a continuation of our application Ser. No. 07/837,459 filed Feb. 14, 1992, now abandoned.

BACKGROUND OF THE INVENTION

1. Field of the Invention

This invention relates to an electrostatically chargeable dielectric coating powder and a triboelectric coating process for application of the powder to wood substrates. More particularly the invention pertains to a mass of finely divided, heat fusible, insulating plastic or resin material having a particular average particle size and a particular particle size distribution, and a triboelectric coating process for coating wood substrates utilizing this powdered material whereby powder overspray and reclamation are minimized. This invention, in particular relates to the triboelectric coating of wood with a coating powder and low temperature curing which results in a continuous decorative or protective coating having a minimum number of pinholes.

2. Description of the Prior Art

A number of solventless-type painting or coating systems have been developed in which a finely divided, heat fusible material is deposited on a substrate, which deposit is then fused into a continuous functional or decorative film on the substrate. Representative of these type processes are flame spraying, fluidized bed, hot flocking, electrostatic spray (ESP) and electrostatic fluidized bed (ESFB). ESFB is a hybrid of fluidized bed and ESP, as explained, for example, in U.S. Pat. No. 4,689,241.

Flame spraying and fluidized bed coating processes typically apply thermoplastic resin powders as coatings on metal or other substrates. These techniques, however, proved to have several major disadvantages, one being a general inability to coat at a film thickness much below about 250 microns (10 mils), and another being the necessity to have on hand a relatively large reservoir of each powder used. Subsequently thermosetting powders, for example, epoxides, were utilized and found to be superior to thermoplastic resin powders first used in ESP processes. The inherent advantages of thermosetting resin systems over thermoplastics in powder coating, especially ESP, are well known.

Continual development in the ESP technology provided the breakthrough necessary to make powder coating an economical alternative to conventional liquid coating. In the typical ESP process the coating powder is maintained in a fluidized bed reservoir, injected into an air stream and carried to a spray gun where the powder is charged by passing through a stable corona discharge created by a high voltage source. The charged powder is then transported to a grounded part or substrate to be coated through a combination of electrostatic and aerodynamic forces. The powder is projected toward the substrate so that the aerodynamic forces bring the powder particles as close as possible to the substrate, where electrostatic forces predominate and cause the particles to be attracted to and deposited on the grounded substrate. The coated substrate is then placed in an oven or furnace where the individual powder particles melt, flow and form a continuous film on the substrate.

Several process aspects are involved in ESP, among which are powder charging, powder transport, adhesion mechanisms, self-limitation, back ionization and Faraday cage effect.

During spraying the charged powder particles tend to travel along the lines of the electric field. As the thickness of the deposited powder layer grows, the voltage on the surface of the powder will increase so that oncoming charged particles tend to deposit onto regions of lower thickness which have lower surface voltage. The thickness of the powder layer thus tends to grow uniformly, at least on flat surfaces, and is thus inherently self-limiting or self-regulating.

However, as each successive batch of oncoming charged particles and free ions generated by the high voltage corona discharge approach the powder layer already deposited, the point is reached where the charge on the layer exceeds its dielectric strength and back ionization occurs. At this point any oncoming powder is rejected and loosely adhering powder on the surface falls off.

Also charged particles cannot readily penetrate into corners, recesses and other hard to reach zones of a complicated substrate, for example, a two-sided can body, because the electric field lines cannot penetrate into them due to the shielding or screening effect of the surrounding conductive body. This is called the Faraday cage effect which states that any empty space (free of charge) enclosed within a conductor is free from any field. As a rule of thumb, an electric field will not penetrate in such a cavity beyond a depth equal to the radius of the cavity opening. The electric field lines will concentrate on the shoulders (or rims) of the cavity, typically the most forward edge facing the spray gun.

Some imperfections in the final coating may be the direct result of defects in the powder layer (e.g. from back ionization and Faraday cage effects) prior to fusion of the powder layer.

The self-limiting aspect of ESP has significant implications. For example, unskilled operators are able to spray at least flat substrates with only brief instruction and training since it is virtually impossible to create runs, drips or sags which are characteristic of spray applied liquid finishes. Further it makes possible the relatively easy and practical design of automatic spray installations. For example, multiple electrostatic spray guns may be mounted on reciprocators and positioned in staggered opposition to each other in an enclosed spray booth. Parts to be coated are then moved between the two banks of spray guns where a uniform coating of powder is applied. And since the applied layer is self-limiting, sufficient powder can be charged and applied to be sure there are no unduly thin or uncoated areas. Overspray powder is captured in the reclaim system and reused.

Compared to flame spraying and fluidized bed coating, some major advantages of ESP are that generally thinner films on the order of 75 microns (3 mils) or less can be consistently applied, smaller quantities of powder are used, and more intricately shaped substrates can be more uniformly coated. Consequently ESP has become a firmly established technology in which coatings, both thick and thin, can be consistently and uniformly applied on substrates, both flat-surfaced articles as well as some complicated or intricate shapes. ESP has proven suitable for applying a wide variety of such insulator or dielectric coatings as plasticized PVC, nylon, cellulosic, epoxy, polyurethane, polyester, acrylic and hybrid resin powders on a wide range of conductive substrates, especially metallic articles, such as can bodies, wire goods, pipe, tool housings, fire extinguisher bodies, household appliances, floor polishing machinery, sewing machine parts, hospital beds, trailer hitches, parts and accessories for automobile, motorcycle and bicycle, furniture for lawn, garden, office and home, and structural sections and facade elements.

The powder coating of wood has been much discussed in the trade and in the literature but very little has been said as to how it may be accomplished. As Douglas S. Richart stated in his article published in the April, 1996 issue of *POWDER COATINGS*, the coating of wood with a low temperature cure powder is next to impossible because the coating must be cured at a temperature below 200° F. and the resin must have a flow temperature of about 10 to 20 degrees lower than that. Such a resin tends to block during storage at normal temperatures. Richart goes on to say that the curing agent must be sufficiently reactive that the powder will cure in a reasonable time at such low temperatures. But that leads to a possible thermosetting of the resin in the extruder. He speaks of electrostatically spraying a powder having a blocked isocyanate onto wood, heating the coating in infrared and other type ovens to form a smooth coating and curing the smooth coating with ultra-violet radiation.

In its technical bulletins, Boise Cascade shows the use of hand-held electrostatic spray guns in coating its electrically conducting particle board.

The resin powders are typically produced by melt-mixing techniques, for example, by homogeneously mixing such basic ingredients as the resin, hardening agent, flow agent, pigments, fillers and other additives; feeding the mixture to a high shear mixer, for example, an extruder where the meltable ingredients fuse at a temperature of about 90° to 150° C. (194° to 310° F.), depending on the resin type, and the nonmeltable ingredients are intermixed with the melted material, for example, by the augers of the extruder; feeding the material exiting the mixer usually in the form of a continuous ribbon or strand into a system, for example, of distributing rolls and conveyor where the extrudate is water cooled to room temperature; crushing the thoroughly cooled extrudate into small chips; and then granulating and grinding the chips into small particles which are then generally sifted through, for example, a 140 micron sieve to obtain a homogeneous powder. The larger particles are typically reclaimed and recycled back through the grinder.

A major disadvantage, however, of ESP using a corona discharge gun is that a high voltage field is set up between the gun and the part to be coated. Complicated substrates or parts having deep angles, recesses, etc., are very difficult to coat principally because of the aforementioned Faraday cage effect. Indentations, inner edges, re-entrant corners, struts and surfaces overlapped by, for example, bonded-on parts are typical of the problematic zones needing coating. Due to this general inability to effectively coat such zones, overspray powder captured in the reclaim system has become a major problem in the industry which has led to the development of various solutions including new and improved corona discharge gun designs, as well as more efficient reclaim systems.

Faraday cage or electrostatic screening effects alone cannot explain all difficulties encountered in coating problematic areas. For example, aerodynamic effects have been found to be at least partially responsible in some situations, especially where constricted areas exist. The air or gas propelled powder, often deposited sparingly in these zones initially, is thus repeatedly blown away by aerodynamic (e.g. venturi) effects, thus satisfactory coating of these areas is often almost impossible.

It has been found that the difficulties mentioned can only be overcome by taking into account electrostatic and aerodynamic laws. Only very precise matching of all electrostatic and aerodynamic parameters can result in any fundamental improvement in the corona ESP system and equipment, principally due to the intrinsic electrostatic field between the corona and the article to be coated.

Another approach has been the use of a triboelectric gun in place of the corona discharge gun in the aforementioned ESP system. With this type triboelectric gun, as exemplified in U.S. Pat. Nos. 3,903,321 and 4,071,192, powder charging occurs by the frictional contact of the air transported powder particles with the interior tubular surfaces of the gun, relying on the phenomenon of electrical charging which occurs when two dielectric or insulating materials (i.e. the powder and the gun surfaces) are caused to be rubbed against each other. In theory, the effect achievable is dependent on the dielectric constant of the materials used. As reported by R. P. Lehman in a 1988 article entitled "Optimized Powder Coating of Critical Objects", an exemplary list of such materials, in descending order of their relative dielectric constants from the positive end to the negative end, is as follows:

| | Dielectrical Series |
|---|---|
| | Positive end |
| 24 | Polyethylene oxide |
| 23 | Polyurethane |
| 22 | Plexiglass |
| 21 | Epoxy resin |
| 20 | Polyvinyl acetate |
| 19 | Glass |
| 18 | Urea/formaldehyde |
| 17 | Wool |
| 16 | Polyamide (Nylon) |
| 15 | Polyvinyl alcohol |
| 14 | Cellulose |
| 13 | Metals |
| 12 | Rubber |
| 11 | Cellulose acetate |
| 10 | Polyester resins |
| 9 | Polystyrene |
| 8 | Anthracene |
| 7 | Silicone |
| 6 | Nitrocellulose |
| 5 | Polyacrylonitrile |
| 4 | PVC |
| 3 | Polypropylene |
| 2 | Polyethylene |
| 1 | Polytetrafluoroethylene (PTFE) |
| | Negative end |

To achieve maximum chargeability it is believed that the two materials should differ considerably in electronegativity. It is easy to see from the above list why pure PTFE has generally become the material of choice in the industry for the gun's rubbing material. It can also seen, for example, that epoxy powder is much more suitable than polyester powder for charging in a gun using PTFE. However, other materials, such as nylon, have been successfully used as the rubbing material whenever the coating powder chosen, such as polypropylene, is too close to PTFE in the dielectric series.

The exemplary list of 24 materials above are the pure resins or materials. However, coating powders normally contain not only resins but, for example, up to 50% by weight of fillers, pigments and other additives which can influence chargeability. All powder paint systems do not lend themselves easily to tribocharging. Due to low polarity, several resin systems suffer from insufficient chargeability, for example, carboxy functional polyesters. Attempts have been made to solve this problem through addition of special additives, e.g. amines, to obtain the required chargeability by stabilizing positive charges. See, for example, European Pat. No. 371,528. However, such additives have disadvantages, for example, they may separate from the powder in the reclaim recycling process, yielding a negative influence on the powder coating properties, etc. Amines, for example, are also catalysts for unwanted chemical reactions (e.g. in the pre-mix extruder) and can adversely affect the cure behavior of the powder paint.

One explanation of the triboelectric coating system suggests that electrons are separated from the powder particles which become positively charged upon exiting the PTFE gun and are thus attracted to the substrate which is earthed or grounded. The tribo-gun also usually has an electrode (grounded) to remove the equal and opposite charge which builds up on the gun barrel. See, for example, the Journal of Electrostatics, 16, 1985, pages 277–286, and SME Technical Paper (FC 89-626) by J. Dailidas, Oct. 16–19, 1989, 12 pages, for further details regarding the principles of triboelectronics.

By utilizing a tribo-gun the high voltage and the strong electrostatic field between the spray gun and the article (characteristic of the corona gun) is dispensed with and the Faraday cage and back ionization effects are reduced, hence penetration of the powder into problematic areas of complicated shapes, as aforementioned, is greatly facilitated. This replacement of the corona gun with a tribo-gun reduces the penetration problem generally to one of controlling the aerodynamic conditions. Some of the remaining variables influencing efficiency of the triboelectric coating systems are contact time, conductivity, temperature, humidity and particle size.

It is know that variations in average particle size (Mv) and particle size distribution (Mx) have important implications on the operation of electrostatic powder coating systems. In general most electrostatic powders have a Mx from about 150 to 200 microns down to sub-micron levels, through the Mv falls in the range of about 20–50 microns. It is now common practice to remove the coarse particles, for example, by sieving as they are known to have an adverse effect on the final coating, e.g. reduced smoothness. It is also generally known that fines of less than about 10 microns are detrimental to efficient coating and may be removed, for example, by air classification.

For more particulars on various aspects of the background prior art, see Polym.-Plast. Technol. Eng., 7(2), 1976, pages 119–220; Kirk-Othmer: Encyclopedia of Chemical Technology, vol. 19, 3rd Ed., 1982, pages 1–7; Paint and Resin, October 1989, pages 8 and 10; Products Finishing Magazine, January 1990, pages 1–8; "The Particle Size Distribution of Powder Coating", by K. Swamborn presented at May 15–16, 1990, seminar, 24 pages, Hosokawa MicroPul; Proceedings of the Eighteenth Water-borne, Higher-Solids, and Powder Coatings Symposium, Feb. 6–8, 1991, "Powder Coatings—A Brief Review of the Technology", by D. Richart, pages 191–211; Particle News, Issue #2, 2 pages, British Rema Manuf. Co., Ltd., and U.S. Pat. Nos. 3,822,240; 4,027,066; 4,056,653, 4,109,027; 4,113,681; 4,154,871 and 4,172,776.

A two component powder coating system and process for triboelectric coating of wood is described in assignee's copending application entitled "Two Component Powder Coating System and Method for Coating Wood Therewith" (Correll et al); application Ser. No. 08/643,694 filed May 6, 1996, now abandoned.

Examples of further prior art dealing with electrostatic thermosetting coating powders are illustrated by samples J, K and N in Table 7 below.

SUMMARY OF THE INVENTION

The principal object of the present invention is to electrostatically spray coat plastic powder via triboelectric coating procedures onto wood substrates in an efficient manner thereby minimizing overspray and reclamation efforts. It is a related object of this invention to provide a low temperature method for producing a continuous protective or decorative coating on wood having a minimum number of pinholes.

Briefly, these and other objectives of this invention are achieved by limiting the quantity of coarse and fine particles in the dielectric coating powder so that a mass thereof has an overall average particle size (Mv) of between about 30 and 45 microns and, most critically, has a particle size distribution (Mx) of:

0–5% larger than 88 microns (=95–100%<88μ),

85–95% larger than 15.56 microns (=5–15%<15.56μ) and

94–100% larger than 11 microns (=0–6%<11μ).

Preferably the coating powder mass has an Mx, as above defined, with 0% larger than 88 microns (=100%<88μ) and an Mv equal to about 30–40, preferably about 35–40, microns. More preferably the powder mass has an Mx of:

0% larger than 88 microns (=100%<88μ),

85–90% larger than 15.56 microns (=10–15%<15.56μ) and

94–96% larger than 11 microns (=4–6%<11μ)

and an Mv equal to about 35–36 microns. Most preferably the powder mass has an Mx of:

0% larger than 88 microns (=100%<88μ), about 88.5% larger than 15.56 microns (=11.5%<15.56μ) and about 95.7% larger than 11 microns (=4.3%<11μ)

and an Mv of about 35.9. Preferably the powder mass is composed of a thermosetting resin base formulation.

In accordance with a further aspect of the invention the improvement also extends to an ESP process for coating substrates wherein the above defined mass of insulating or dielectric powder is delivered or charged to a triboelectric spray gun.

DETAILED DESCRIPTION OF THE INVENTION

Figure 1:
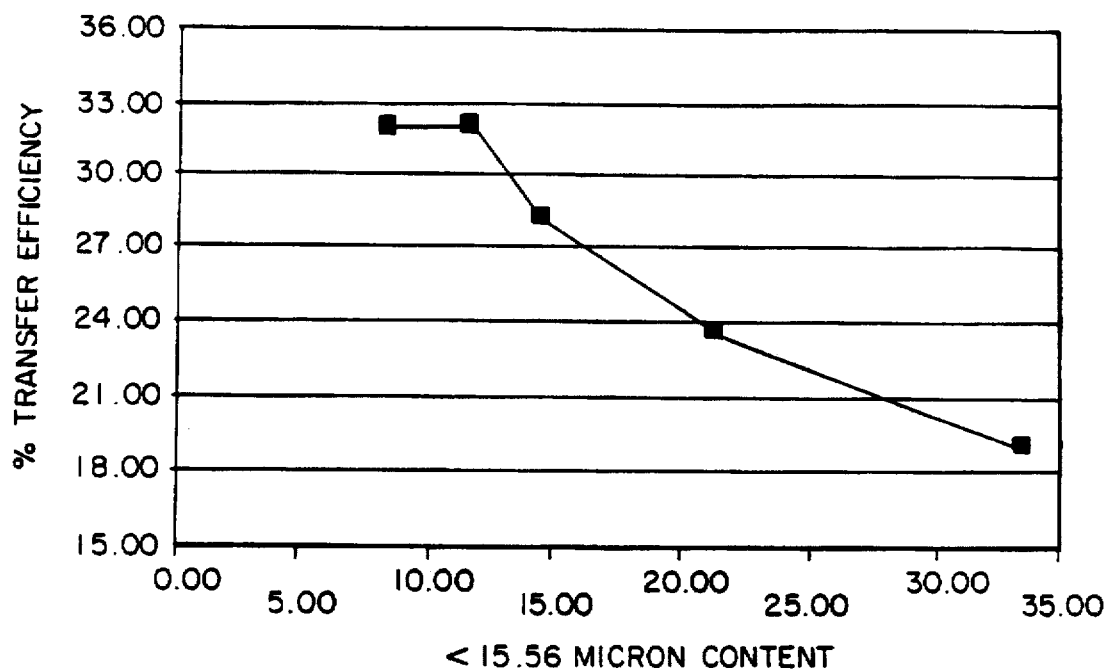
FIG. 1 illustrates in graph form Transfer Efficiency by plotting percent transfer efficiency versus wt. % of particles smaller than 15.56 microns delivered to gun.

A more complete understanding of the invention will be apparent from the detailed description to follow of the preferred embodiments of the electrostatic coating powder and triboelectric coating process utilizing such powder for coating wood substrates. The critical role of the particle size variable on tribocharging systems has been investigated in depth in an effort to reduce charging and coating variabilities.

The coating powders of the invention have thus been specifically designed and formulated for tribocharging, which is a known modification of conventional ESP coating systems and procedures as set forth in the preceding background information. The applicable coating powders under this invention may be any of the materials aforementioned with respect to the corona discharge technique, preferably thermoset-based powders including epoxies, acrylics, polyesters, polyurethanes and hybrids thereof.

The coating powder of this invention may be used on metallic substrates but its particular utility for coating woods makes it highly appealing as a commercially viable alternative to processes such as laminating films and coating liquids that have been almost universally used in the past. For the purposes of this invention, wood is defined as any lignocellulosic material whether it comes from trees or other plants and whether it be in its natural forms or its fibers have been separated, felted, and compressed to form hardboard, medium density fiberboard, or the like. Particle board, whether standard or treated to enhance its electrical conductivity, and oriented strand board are also within the definition of wood for this invention. Wood having a moisture content of from 3 to 10% by weight is suitable for the purposes of this invention.

As aforementioned, tribocharging offers well documented advantages over corona discharge in that tribo-guns require no high voltage supply, obtain better Faraday cage penetration, create less back ionization, achieve a wider range of minimum and especially maximum coating thicknesses, produce smoother and more continuous films, and achieve more consistent overall performance, especially in coating articles of complex configuration. The improvement is centered upon a modification of particle size which has led to unexpected results in overall triboelectric coating efficiency. The Mv and Mx were measured throughout this text by a Leeds & Northrop MICROTRAC® analyzer in the dry mode.

In an embodiment of the invention a thermosetting starting powder, CORVEL® 10-7199, was prepared by the aforementioned conventional technique of melt compounding and grinding a cooled extrudate. (CORVEL is a registered trademark of the assignee.) The resulting particle size distribution (Mx) of a Sample E of 10-7199 as set forth in Table 1 below is typical of powders which are commercially available for electrostatic spray application via, for example, corona discharge ESP equipment. Based upon the most up-to-date knowledge of tribocharging applications and trade literature, it was first thought that a coarser distribution would improve 10-7199. See Sample F, Table 2 below. While Sample F provided some improvement, it was generally unacceptable because the coarser distribution caused large swings in performance as reclaim powder was recycled and mixed with virgin powder. Also unacceptable amounts of overspray powder tended to increase or build up in the coating system. Sample E was then further modified by air classification (A/C) resulting in an overall narrower distribution. See Samples A, B, C and D of Table. The resulting Sample A–D powders showed a marked improvement in Transfer Efficiency (see Table 3 below), Gun Current (see Table 4 below) and Charge to Mass ratio (see Table 5 below), which three measures are used to most effectively evaluate tribochargeability.

Quite surprisingly, it was observed than an optimum point in the Mx range beyond which further classification yielded no further benefits. See FIGS. 1, 2 and 3. The optimum is significant not only from a powder performance standpoint, it also reduces the potential economic penalties derived from reworking removed fines. That is to say fines removed by air classification, to produce the desired Mx, are typically reextruded and reground to reduce waste. Although this improves the efficiency of the classification, it is an added step with an associated cost. Thus it is essential to minimize the amount of fines removed to reach the desired performance characteristics.

FIG. 1 graphically depicts Transfer Efficiency by plotting percent transfer efficiency, $E_t$ (on the ordinate) versus the weight percent of particles less than 15.56 microns delivered to the tribo-gun (on the abscissa). The $E_t$ value for a given powder sample or lot is derived by obtaining the weight (D) of the sprayed powder adhering to a substrate, dividing D by the total weight (W) of the powder delivered by the gun times one hundred. Thus the formula for calculating % $E_t=D/W\times 100$. The plotted values for $E_t$ are typically an average of three readings per sample.

Figure 2:
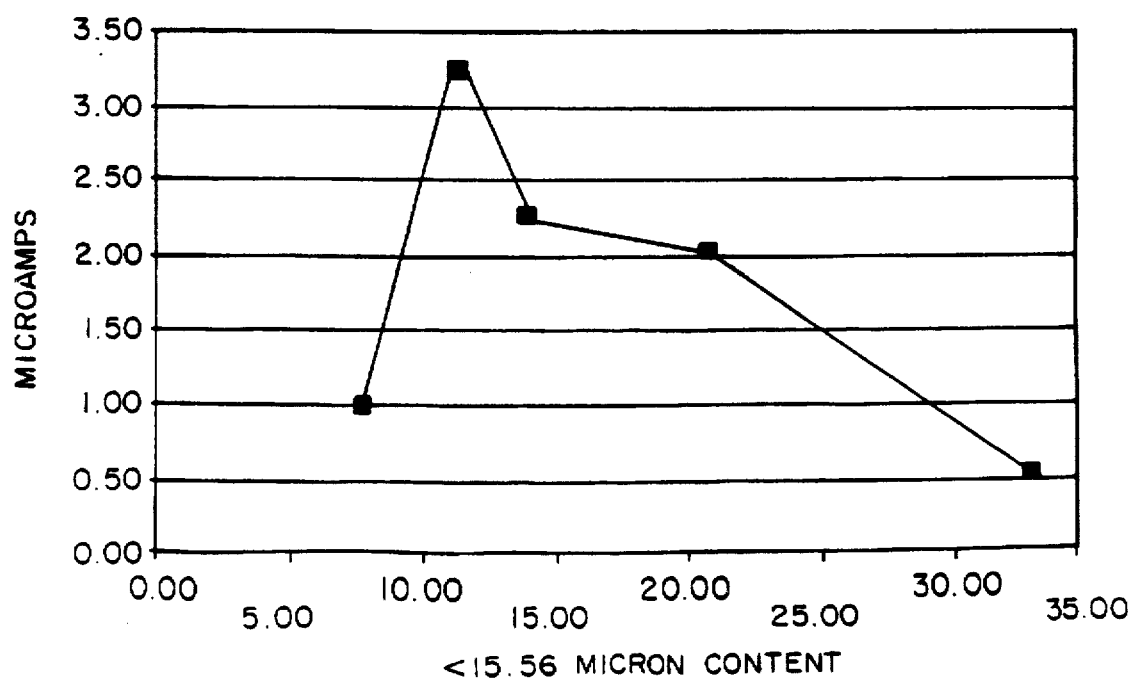
FIG. 2 illustrates in graph form Gun Current by plotting gun current in microamps versus wt. % of particles smaller than 15.56 microns delivered to gun.

FIG. 2 graphically depicts Gun Current by plotting the gun current (on the ordinate) versus the weight percent of particles less than 15.56 microns delivered to the tribo-gun. The gun current value for a given powder sample is the current produced in the tribo-gun which is typically measured by a LED microameter in the ground circuit for the gun. Typically after starting the powder loaded gun the amperage readings are repeated three times at about one minute intervals.

Figure 3:
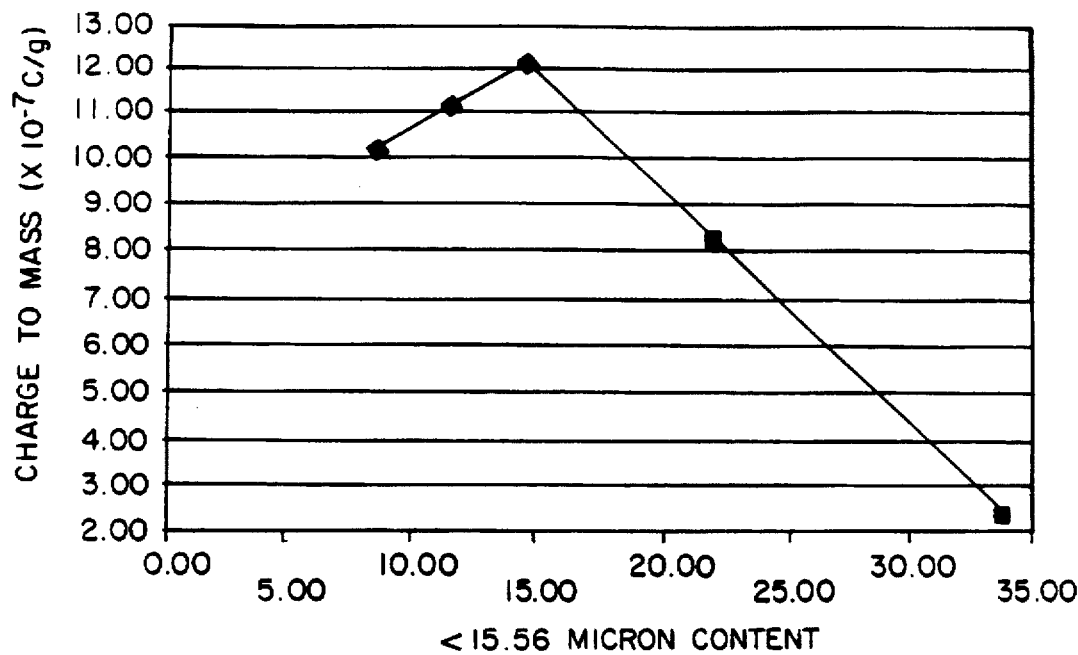
FIG. 3 illustrates in graph form Charge to Mass by plotting the powder charge on the mass of powder sprayed (C/g) versus wt. % of particles smaller than 15.56 microns delivered to gun.

FIG. 3 graphically depicts Charge to Mass by plotting the ratio of the electrical charge on the mass of powder being tribo-charged (on the ordinate) versus the weight percent of particles less than 15.56 microns delivered by the gun. The ratio of electrical charge on the powder mass ($M_c$) is defined as a unit of electrical charge expressed in Coulombs (C) divided by the weight (g) in grams of the powder delivered to the gun; thus $M_c=C/g$. The charge to mass value for a given powder sample is typically obtained by meter readings using a Wolfson electrostatic powder coating test kit. The plotted values typically are an average of three readings for a given sample.

Figure 4:
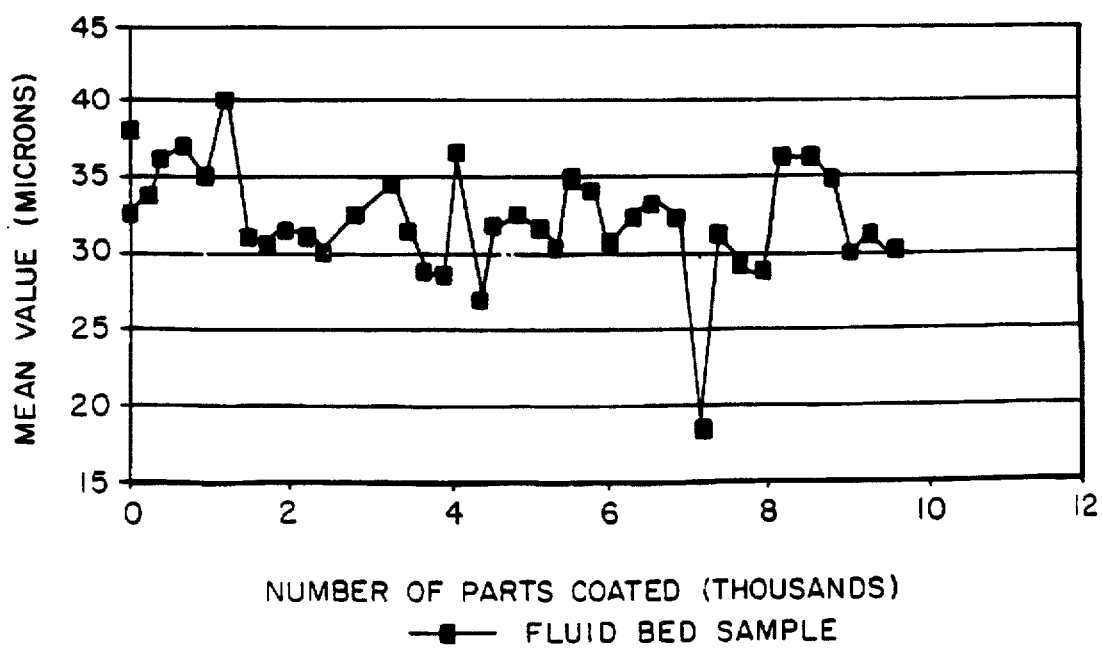
FIG. 4 illustrates in graph form a commercial run of multiple samples of 10-7272 powder by plotting Mean Value versus Number of Parts Coated.

Further, air classified powder so produced (CORVEL 10-7272) yielded improved, consistent performance in a commercial triboelectric coating system as demonstrated in FIG. 4, which graphically depicts Mean Value (on the ordinate) versus Number of Parts Coated (in thousands). Mean Value represents the average particle size in microns of the 10-7272 powder delivered to the gun by way of a conventional fluidized bed system, including any recycled reclaim. Several different preparations (same composition) of samples or lots of 10-7272 were tested and plotted in FIG. 4. All initial samples were virgin 10-7272 within the distribution range:

0–5% larger than 88 microns, 88–95% larger than 15.56 microns and 94–100% larger than 11 microns, and an Mv of 30–40 microns.

TABLE 1

PARTICLE SIZE

| % RETAINED @ | SAMPLE | | | | | | | | |
|---|---|---|---|---|---|---|---|---|---|
| | A* | B* | C* | D* | E (CORVEL 10-7199 stock) | G (CORVEL 10-7223 stock) | H** | L (CORVEL) 10-7068 stock) | M*** |
| 124.45µ | 0.0 | 0.0 | 0.0 | 0.0 | 0.0 | 0.0 | 0.0 | 0.0 | 0.0 |
| 88.00µ | 0.0 | 0.0 | 0.0 | 0.0 | 5.4 | 2.59 | 2.37 | 0.0 | 0.58 |
| 62.23µ | 11.4 | 8.0 | 9.3 | 5.1 | 11.6 | 17.62 | 22.22 | 19.7 | 18.78 |
| 44.00µ | 37.1 | 29.5 | 30.1 | 22.9 | 22.6 | 34.38 | 44.68 | 40.07 | 39.30 |
| 31.11µ | 65.8 | 56.5 | 54.3 | 45.0 | 41.4 | 49.47 | 63.75 | 55.44 | 58.57 |
| 22.00µ | 82.9 | 75.7 | 72.6 | 64.4 | 55.0 | 61.79 | 80.17 | 71.90 | 76.27 |
| 15.56µ | 91.9 | 88.5 | 85.7 | 78.7 | 66.7 | 72.59 | 91.57 | 81.12 | 89.01 |
| 11.00µ | 97.0 | 95.7 | 94.3 | 89.9 | 76.8 | 82.21 | 98.11 | 90.58 | 97.18 |
| 7.78µ | 98.8 | 98.4 | 98.1 | 95.8 | 84.1 | 88.23 | 100.00 | 96.49 | 99.49 |
| 5.50µ | 100.0 | 100.0 | 100.0 | 96.7 | 89.3 | 92.87 | 100.00 | 100.00 | 100.00 |
| 3.89µ | 100.0 | 100.0 | 100.0 | 100.0 | 94.3 | 96.64 | 100.00 | 100.00 | 100.00 |
| 2.75µ | 100.0 | 100.0 | 100.0 | 100.0 | 97.9 | 98.70 | 100.00 | 100.00 | 100.00 |
| 1.94µ | 100.0 | 100.0 | 100.0 | 100.0 | 100.0 | 100.00 | 100.00 | 100.00 | 100.00 |
| Average Size, Mv | 39.6µ | 35.9µ | 35.5µ | 31.2µ | 31.4µ | 35.80µ | 43.41µ | 38.95µ | 40.24µ |
| DISTRIBUTION WIDTH (Analyzer Channels Reporting) | 7 | 7 | 7 | 8 | 11 | 12 | 7 | 8 | 8 |
| % < 15.56µ | 8.07 | 11.50 | 14.30 | 21.30 | 33.30 | 27.41 | 8.43 | 18.88 | 10.99 |

*CORVEL 10-7272 (A/C 10-7199)
**A/C CORVEL 10-7223
***A/C CORVEL 10-7068

TABLE 2

PARTICLE SIZE

| % RETAINED @ | SAMPLE F* |
|---|---|
| 248.90µ | 1.2 |
| 176.00µ | 4.5 |
| 124.45µ | 13.1 |
| 88.00µ | 25.1 |
| 62.23µ | 42.9 |
| 44.00µ | 59.5 |
| 31.11µ | 69.4 |
| 22.00µ | 78.9 |
| 15.56µ | 87.2 |
| 11.00µ | 91.1 |
| 7.78µ | 94.2 |
| 5.50µ | 96.7 |
| 3.89µ | 98.5 |
| 2.75µ | 100.0 |
| 1.9µ | 100.00 |
| AVERAGE SIZE, Mv | 66.4 |
| DISTRIBUTION WIDTH (Analyzer Channels Reporting) | 13 |
| % < 15.56µ | 12.8 |

*course CORVEL 10-7199

TABLE 3

TRANSFER EFFICIENCY

| SAMPLE | A | B | C | D | E |
|---|---|---|---|---|---|
| (%) | 32.0 | 32.0 | 28.3 | 23.7 | 18.9 |
| | G | H | I | L | M |
| | 24.71 | 31.55 | 38.39 | 24.46 | 27.55 |

TABLE 4

GUN CURRENT

| SAMPLE | A | B | C | D | E |
|---|---|---|---|---|---|
| (Microamps) | 1.0 | 3.25 | 2.25 | 2.0 | 0.5 |
| | G | H | I | L | M |
| | 0.5 | 2.00 | 2.00 | 1.00 | 2.25 |

TABLE 5

CHARGE TO MASS

| SAMPLE | A | B | C | D | E |
|---|---|---|---|---|---|
| ($\times 10^{-7}$ Coulombs/gram) | 10.2 | 11.2 | 12.0 | 8.3 | 2.5 |
| | G | H | I | L | M |
| | 8.30 | 10.9 | 7.79 | 6.3 | 12.2 |

In another embodiment of the invention the Mx of another commercially available stock or starting thermosetting powder, CORVEL 10-7223 (which was similarly prepared as the 10-7199 stock), is set forth as Sample G in Table 1. And similarly to coarse Sample F in Table 2, a coarse Sample I of 10-7223 was prepared; see Table 6 below. While showing some improvement, Sample I was generally unacceptable for similar reasons stated regarding Sample F. Stock Sample G was then further modified to form Sample H, Table 1, by air classification resulting in an overall narrower Mx. The resulting Sample H powder, similarly to Samples A, B and C of 10-7272, showed a marked improvement in Transfer Efficiency, Gun Current and Charge to Mass. See Tables 3, 4 and 5 respectively.

TABLE 6

PARTICLE SIZE

| % RETAINED @ | SAMPLE I* |
|---|---|
| 248.90μ | 0.0 |
| 176.00μ | 0.0 |
| 124.45μ | 1.67 |
| 88.00μ | 13.22 |
| 62.23μ | 36.72 |
| 44.00μ | 63.21 |
| 31.11μ | 83.15 |
| 22.00μ | 93.90 |
| 15.56μ | 98.40 |
| 11.00μ | 100.00 |
| 7.78μ | 100.00 |
| 5.50μ | 100.00 |
| 3.89μ | 100.00 |
| 2.75μ | 100.00 |
| 1.94μ | 100.00 |
| AVERAGE SIZE, Mv | 57.04 |
| DISTRIBUTION WIDTH | 8 |
| (Analyzer Channel Reporting) | |
| % > 15.56 | 98.40 |
| % > 11.00 | 100.00 |
| % > 88.00 | 13.22 |

*Coarse CORVEL 10-7223

In yet another embodiment of the invention the Mx of another commercially available stock or starting thermosetting powder, CORVEL 10-7068, which was similarly prepared as the 10-7199 and 10-7223 stock, is set forth as Sample L in Table 1. Stock Sample L was then further modified to form Sample M, Table 1, by air classification resulting in an overall narrower Mx. The resulting Sample M powder, similarly to Samples A, B, C and H, showed a marked improvement in Transfer Efficiency, Gun Current and Charge to Mass. See Tables 3, 4 and 5, respectively.

Consequently, based on the specific embodiments of the invention; namely, samples A, B, C, H and M, the novel mass of electrically chargeable plastic powder which is tribocharged broadly has a particle size distribution (Mx) of (all percents defined in weight percent):

0%–5% larger than 88 microns (=95–100%<88μ),

85%–95% larger than 15.56 microns (=5–15%<15.56μ) and

94%–100% larger than 11 microns (=0–6%<11μ), and an average particle size (Mv) of between about 30 and about 45 microns.

Preferably the dielectric coating powder mass according to the invention (Samples A, B and C) has an Mx as above defined with 0% larger than 88 microns (=100%<88μ) and an Mv of about 30–about 40 microns, preferably about 35–40 microns.

More preferably the dielectric powder mass of the invention (Samples B and C) has an Mx of:

0% larger than 88 microns,

85%–90% larger than 15.56 microns (=10–15%<15.561μ) and

94%–96% larger than 11 microns (=4–6%<11μ), and an Mv of about 35–about 36 microns.

Most preferably the dielectric powder mass has an Mx as shown in Sample B of:

0% larger than 88 microns, about 88.5% larger than 15.56 microns (=about 11.5%<15.56μ) and about 95.7% larger than 11 microns (=about 4.3%<11μ), and an Mv of about 35.9.

Preferably the powder mass according to the invention is a formulation based on a thermosetting resin.

For comparative purposes, Samples J, K and N of prior art thermosetting paint powders are set forth in Table 7 below. The particle size of Samples J and K are too coarse, i.e. the percent retained greater than 88 microns is too high, and would be expected to perform in much the same unacceptable fashion as preceding coarse Samples F and I. The particle size of Sample N is too low in the percent retained at both 15.56 and 11 microns; thus Sample N would be expected to perform in much the same unacceptable manner as preceding similar Sample D.

TABLE 7

(PRIOR ART) PARTICLE SIZE

| SAMPLE | J* | K** | N*** |
|---|---|---|---|
| % RETAINED @ | | | |
| 124.45μ | 0.0 | 4.64 | 0.0 |
| 88.00μ | 8.44 | 21.12 | 0.0 |
| 62.23μ | 27.48 | 46.28 | 6.42 |
| 44.00μ | 51.27 | 68.74 | 26.80 |
| 31.11μ | 70.21 | 83.27 | 46.05 |
| 22.00μ | 82.05 | 91.53 | 64.19 |
| 15.56μ | 90.87 | 96.46 | 77.83 |
| 11.00μ | 95.97 | 99.02 | 87.47 |
| 7.78μ | 98.45 | 100.00 | 92.19 |
| 5.50μ | 100.00 | 100.00 | 94.60 |
| 3.89μ | 100.00 | 100.00 | 100.00 |
| 2.75μ | 100.00 | 100.00 | 100.00 |
| 1.94μ | 100.00 | 100.00 | 100.00 |
| AVERAGE SIZE, Mv | 48.11μ | 63.36μ | 31.91μ |
| DISTRIBUTION WIDTH | 9 | 8 | 9 |
| (Analyzer Channels Reporting) | | | |
| % < 15.56μ | 9.13 | 3.54 | 22.17 |

*Becker ER-7493 SG
**Tiger White Base
***Lilly 907 B-S

The triboelectric coating process of the present invention is particularly effective in situations such as when the wooden substrate is profiled. The grooves and ridges present a particular problem for electrostatic coating processes because of the Faraday effect. Because the electrical charge generated by friction as the powder flows along the TEFLON plastic surfaces inside the gun are relatively small in comparison with the charge picked up as the powder flows through a corona-discharge cloud. Wooden cabinet doors are examples of a profiled wooden substrate as are the doorskins represented by the drawings in U.S. Pat. No. 5,489,460, which further illustrates the type of wooden panels that are particularly susceptible to powder coating by the method of this invention. The grooves and sharp edges of such panels are covered very well on a flat line coating apparatus with nozzles arrayed to direct a portion of the powder against them.

Such panels as well as flat-surfaced panels such as those used to make ping-pong tables are particularly well coated by triboelectric guns on a flat line conveyor having electrically conductive bands around the circumference of the conveyor belt. Apparatus for such coating is disclosed in a series of patents assigned to the Nordson Corporation. These are U.S. Pat. Nos. 4,498,913; 4,590,884; 4,723,505; 4,871,380; 4,910,047; and 5,018,909.

A suitable flat line powder coating apparatus comprises such a conveyor extending through a powder coating booth, wherein a wooden article supported and moved by the conveyor belt is coated triboelectrically by a plurality of guns situated adjacent one another and in one or more tiers. The powder is forced into the guns under about 40 psi pressure and air at about 20 psi is passed into the powder conduits just before the powder passes into the nozzles. The article bearing the powder is then conveyed through a curing oven having several heating zones, some of which are heated by IR lamps, others by heat convection, and still others by a combination of those two. The coating and the curing line speeds may be the same or different, depending on the length of the curing oven. The line speed through the powder application booth may be from about 5 to about 150 feet per minute but preferably from about 20 to about 100 feet per minute. The line speed through the curing oven, on the other hand, may be from about 5 to about 20 feet per minute, depending on the oven temperature, the length of the oven, and the particular coating powder used. The curing temperature may range from about 180° up to but not including the decomposition temperature of the powder. It is preferred to maintain the cure temperature within the range of from about 190° to about 300 ° F. and still more preferred to keep the cure temperature at from about 250° to about 300° F. When a crystalline epoxy resin is used, a cure temperature of about 180° F. is particularly suitable. It is preferred that the coating and curing line speeds be adjusted to the oven length so that they are balanced.

Preheating of the panel before the coating step is preferred in some instances, e.g., to help the powder reach its flow temperature in the first zone of the oven and it also minimizes outgassing during cure. The oven may be several heating zones, both IR and convection type and also a combination of the two. The TRIAB Speedoven sold by Thermal Innovations Corporation is suitable for the purposes of this invention. The film thickness of the cured coating is at least about 1 mils and it may be as much as about 8 mils or even higher if there is a practical need for such. Film thicknesses of from about 4 to about 6 mils are achieved regularly by the method of this invention, even at coating line speeds of about 100 feet per minute.

In a further embodiment lab tests run to determine the wood coating characteristics of powders prepared on a common basis having a particle size distribution within the invention and falling outside the scope of the invention, i.e. the only variable resides in the particle size distribution. Identical size pieces of particle board 5¼"×2¾" were triboelectrically coated with a hand-held gun using 10 grams of the powders sprayed out completely. The thickness of the coating was then measured after a 300° F.-10 minute cure cycle. The results of the five points measured on each piece in mils were as follows:

TABLE 8

| | Top Right | Bottom Right | M | Bottom Left | Top Left | Av. |
|---|---|---|---|---|---|---|
| Sample O (CORVEL 265-148-2 *Brandy Red | 5 | 1 | 1.4 | 2 | 2.25 | 2.33 |
| Sample P (CORVEL 23-9296 *Brandy Red | 4.1 | 4.8 | 6.0 | 6.2 | 3.9 | 5.00 |

*Brandy Red - 0.4 parts/100 parts resin Chromaphtal Red 3B (Ciba-Geigy) and 13-7011 Red Violet (Hoescht).

Sample O powder had a particle size distribution outside the invention and Sample P had a particle size distribution within the invention. It can be seen from Table 8 that the Sample P (invention) powder provided a thicker coating on the particle board test panels.

With this description of the invention in detail, those skilled in the art will appreciate that various modifications may be made to the invention without departing from the spirit thereof. Therefore, it is not intended that the scope of the invention be limited to the specific embodiments illustrated and described. Rather it is intended that the scope of the invention be determined by the appended claims and their equivalents.

We claim:

1. In a coating process for coating a wood substrate wherein plastic powder is fed to a triboelectric spray gun and in which said powder is then spray deposited onto said wood substrate, said powder having an average particle size, My, of between about 30 and 45 microns, the improvement wherein said powder has particle size distribution, Mx, comprising, all in percents by weight:

95%–100% smaller than 88 microns,

5%–15% smaller than 15.56 microns and

0%–6% smaller than 11 microns.

2. A process according to claim 1 wherein said powder has an Mv of between about 30 and 40 microns and an Mx comprising:

100% smaller than 88 microns,

5%–15% smaller than 15.56 microns and

0%–6% smaller than 11 microns.

3. A process according to claim 1 wherein said powder has an Mv of between about 35 and 36, and an Mx of comprising all in percents by weight;

100% smaller than 88 microns,

10%–15% smaller than 15.56 microns and

4%–6% smaller than 11 microns.

4. A process according to claim 3 wherein the powder has an average particle size, Mv, of about 35.9 and an Mx of:

100% smaller than 88 microns, about 11.5% smaller than 15.56 microns and about 4.3% smaller than 11 microns.

5. A process according to claim 3 wherein the powder is a thermosetting resin composition.

6. A process according to claim 1 wherein the powder is a thermosetting rosin composition.

* * * * *

UNITED STATES PATENT AND TRADEMARK OFFICE
CERTIFICATE OF CORRECTION

PATENT NO. : 5,731,043
DATED : March 24, 1998
INVENTOR(S) : Horinka et al.

It is certified that error appears in the above-identified patent and that said Letters Patent is hereby corrected as shown below:

On the title page item [54], and column 1, line 2, change "PROCEES" to read -- PROCESS --.

| | |
|---|---|
| Col. 3, Ln. 66 | change "venmri" to read -- venturi --. |
| Col. 11, Ln. 67 | change "(=10-15% < 15.561μ)" to read -- (=10-15% < 15.56μ) --. |
| Col. 14, Ln. 32 | change "My" to read -- Mv --. |
| Col. 14, Ln. 62 | change "rosin" to read -- resin --. |

Signed and Sealed this

Fourteenth Day of September, 1999

Attest:

Q. TODD DICKINSON

*Attesting Officer*          *Acting Commissioner of Patents and Trademarks*